(12) United States Patent
Gaal et al.

(10) Patent No.: US 8,982,685 B2
(45) Date of Patent: Mar. 17, 2015

(54) TIME ORTHOGONALIZATION OF REFERENCE SIGNALS

(75) Inventors: Peter Gaal, San Diego, CA (US); Brian C. Banister, San Diego, CA (US); Brian K. Butler, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 737 days.

(21) Appl. No.: 12/576,932

(22) Filed: Oct. 9, 2009

(65) Prior Publication Data

US 2011/0085606 A1    Apr. 14, 2011

(51) Int. Cl.
*H04L 5/00*    (2006.01)

(52) U.S. Cl.
CPC .................................. *H04L 5/0048* (2013.01)
USPC ........................................................ 370/208

(58) Field of Classification Search
CPC ... H04L 5/0048; H04L 5/0037; H04L 5/0023; H04J 11/0069; H04J 11/0073; H04J 11/0076; H04J 11/0079; H04J 11/0083; H04J 11/0086; H04B 2201/70701
USPC ........................................................ 370/208
See application file for complete search history.

(56) References Cited

U.S. PATENT DOCUMENTS

| | | | | |
|---|---|---|---|---|
| 7,443,826 | B1* | 10/2008 | Atarius et al. | 370/342 |
| 2009/0257411 | A1* | 10/2009 | Shitara | 370/336 |
| 2010/0103906 | A1* | 4/2010 | Montojo et al. | 370/335 |

FOREIGN PATENT DOCUMENTS

CN     101473682 A     7/2009

OTHER PUBLICATIONS

Zhou, Yiqing. "OFCDM: A Promising Broadband Wireless Access Technique" IEEE Communications Magazine. Mar. 2008.*
International Search Report and Written Opinion—PCT/US2010/052103—ISA/EPO—Apr. 6, 2011.
KDDI: "Scrambling Code for L1/L2 Control Channel with CDM Based Multiplexing in E-UTRA Downlink", 3GPP Draft; R1-071706, 3rd Generation Partnership Project (3GPP), Mobile Competence Centre ; 650, Route Des Lucioles ; F-06921 Sophia-Antipolis Cedex ; France, vol. RAN WG1, No. St. Julian; 20070403, Apr. 3, 2007, XP050105628, [retrieved on Apr. 3, 2007].
NTT Docomo et al., "Scrambling Code in E-UTRA Downlink", 3GPP Draft; R1-062712 DL Scrambling Code, 3rd Generation Partnership Project (3GPP), Mobile Competence Centre ; 650, Route Des Lucioles ; F-06921 Sophia-Antipolis Cedex ; France, vol. RAN WG1, No. Seoul, Korea; 20061004, Oct. 4, 2006, XP050103200, [retrieved on Oct. 4, 2006].

(Continued)

*Primary Examiner* — Jason Mattis
*Assistant Examiner* — Stephen J Clawson
(74) *Attorney, Agent, or Firm* — Dalei Dong

(57) ABSTRACT

An apparatus for providing wireless coverage to a plurality of sectors includes means for generating a reference sequence, and means for applying a time domain orthogonal sequence to the reference sequence to generate a reference signal for broadcasting over one of the sectors. An apparatus for wireless communications within a sector includes means for receiving a broadcast within a sector, the received broadcast comprising a reference signal having a time domain orthogonal sequence applied to a reference sequence, and means for recovering the reference sequence from the received broadcast.

38 Claims, 13 Drawing Sheets

(56) References Cited

OTHER PUBLICATIONS

NTT Docomo: "Transport Channels and Physical Channels in E-UTRA Downlink", 3GPP Draft; R1-060162 DL Transport.Physical, 3rd Generation Partnership Project (3GPP), Mobile Competence Centre ; 650, Route Des Lucioles ; F-06921 Sophia-Antipolis Cedex ; France, vol. RAN WG1, No. Helsinki, Finland; 20060123, Jan. 19, 2006, XP050417520, [retrieved on Jan. 19, 2006].

Taiwan Search Report—TW099134612—TIPO—Jun. 22, 2013.

* cited by examiner

Sector_A

Sector_B $$
\begin{array}{cccccccccc}
1 & & 1 & & 1 & & 1 & & 1 & \\
 & \alpha^2 & & \alpha^2 & & \alpha^2 & & \alpha^2 & & \alpha^2 \\
\alpha & & \alpha & & \alpha & & \alpha & & \alpha & \\
 & 1 & & 1 & & 1 & & 1 & & 1 \\
\alpha^2 & & \alpha^2 & & \alpha^2 & & \alpha^2 & & \alpha^2 & \\
 & \alpha & & \alpha & & \alpha & & \alpha & & \alpha \\
1 & & 1 & & 1 & & 1 & & 1 & \\
 & \alpha^2 & & \alpha^2 & & \alpha^2 & & \alpha^2 & & \alpha^2 \\
\alpha & & \alpha & & \alpha & & \alpha & & \alpha & \\
 & 1 & & 1 & & 1 & & 1 & & 1 \\
\alpha^2 & & \alpha^2 & & \alpha^2 & & \alpha^2 & & \alpha^2 & \\
 & \alpha & & \alpha & & \alpha & & \alpha & & \alpha \\
1 & & 1 & & 1 & & 1 & & 1 & \\
 & \alpha^2 & & \alpha^2 & & \alpha^2 & & \alpha^2 & & \alpha^2 \\
\alpha & & \alpha & & \alpha & & \alpha & & \alpha & \\
 & 1 & & 1 & & 1 & & 1 & & 1 \\
\alpha^2 & & \alpha^2 & & \alpha^2 & & \alpha^2 & & \alpha^2 & \\
\end{array}
$$

FIG. 3B

Sector_C $$
\begin{array}{cccccccccc}
1 & & 1 & & 1 & & 1 & & 1 & \\
 & \alpha & & \alpha & & \alpha & & \alpha & & \alpha \\
\alpha^2 & & \alpha^2 & & \alpha^2 & & \alpha^2 & & \alpha^2 & \\
 & 1 & & 1 & & 1 & & 1 & & 1 \\
\alpha & & \alpha & & \alpha & & \alpha & & \alpha & \\
 & \alpha^2 & & \alpha^2 & & \alpha^2 & & \alpha^2 & & \alpha^2 \\
1 & & 1 & & 1 & & 1 & & 1 & \\
\alpha^2 & & \alpha^2 & & \alpha^2 & & \alpha^2 & & \alpha^2 & \\
 & 1 & & 1 & & 1 & & 1 & & 1 \\
\alpha & & \alpha & & \alpha & & \alpha & & \alpha & \\
 & \alpha^2 & & \alpha^2 & & \alpha^2 & & \alpha^2 & & \alpha^2 \\
1 & & 1 & & 1 & & 1 & & 1 & \\
\alpha^2 & & \alpha^2 & & \alpha^2 & & \alpha^2 & & \alpha^2 & \\
 & \alpha & & \alpha & & \alpha & & \alpha & & \alpha \\
\alpha & & \alpha & & \alpha & & \alpha & & \alpha & \\
 & 1 & & 1 & & 1 & & 1 & & 1 \\
\end{array}
$$

FIG. 3C

Sector_A

| Time Orthogonalization Sequence | | | | | | | | | |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

FIG. 4A

Sector_B

| Time Orthogonalization Sequence | | | | | | | | | |
|---|---|---|---|---|---|---|---|---|---|
| 1 | 1 | $\alpha$ | $\alpha$ | $\alpha^2$ | $\alpha^2$ | 1 | 1 | $\alpha$ | $\alpha$ |
| 1 | $\alpha^2$ | $\alpha$ | 1 | $\alpha^2$ | $\alpha$ | 1 | $\alpha^2$ | $\alpha$ | 1 |
| $\alpha$ | $\alpha^2$ | $\alpha^2$ | $\alpha$ | 1 | $\alpha^2$ | $\alpha$ | $\alpha^2$ | $\alpha^2$ | $\alpha$ |
| $\alpha^2$ | 1 | 1 | $\alpha^2$ | $\alpha$ | $\alpha^2$ | $\alpha^2$ | 1 | 1 | $\alpha^2$ |
| 1 | $\alpha$ | $\alpha$ | $\alpha^2$ | $\alpha^2$ | 1 | 1 | $\alpha$ | $\alpha$ | $\alpha^2$ |
| $\alpha$ | $\alpha^2$ | $\alpha^2$ | $\alpha$ | 1 | $\alpha^2$ | $\alpha$ | $\alpha^2$ | $\alpha^2$ | $\alpha$ |
| $\alpha^2$ | 1 | 1 | $\alpha^2$ | $\alpha$ | $\alpha^2$ | $\alpha^2$ | 1 | 1 | $\alpha^2$ |
| 1 | $\alpha$ | $\alpha$ | $\alpha^2$ | $\alpha^2$ | 1 | 1 | $\alpha$ | $\alpha$ | $\alpha^2$ |
| $\alpha$ | $\alpha^2$ | $\alpha^2$ | 1 | 1 | $\alpha$ | $\alpha$ | $\alpha^2$ | $\alpha^2$ | 1 |
| $\alpha^2$ | 1 | 1 | $\alpha$ | $\alpha$ | 1 | $\alpha^2$ | 1 | 1 | $\alpha$ |

FIG. 4B

Sector_C

| Time Orthogonalization Sequence | | | | | | | | | |
|---|---|---|---|---|---|---|---|---|---|
| 1 | 1 | $\alpha^2$ | $\alpha^2$ | $\alpha$ | $\alpha$ | 1 | 1 | $\alpha^2$ | $\alpha^2$ |
| 1 | $\alpha$ | $\alpha^2$ | 1 | $\alpha$ | $\alpha^2$ | 1 | $\alpha$ | $\alpha^2$ | 1 |
| $\alpha^2$ | 1 | $\alpha$ | $\alpha^2$ | 1 | $\alpha$ | $\alpha^2$ | 1 | $\alpha$ | $\alpha^2$ |
| $\alpha$ | $\alpha^2$ | 1 | $\alpha$ | $\alpha^2$ | 1 | $\alpha$ | $\alpha^2$ | 1 | $\alpha$ |
| 1 | $\alpha^2$ | $\alpha^2$ | $\alpha$ | $\alpha$ | 1 | 1 | $\alpha^2$ | $\alpha^2$ | 1 |
| $\alpha^2$ | $\alpha$ | $\alpha$ | 1 | 1 | $\alpha^2$ | $\alpha^2$ | $\alpha$ | $\alpha$ | $\alpha^2$ |
| $\alpha$ | 1 | 1 | $\alpha^2$ | $\alpha^2$ | $\alpha$ | $\alpha$ | 1 | 1 | $\alpha$ |
| 1 | $\alpha^2$ | $\alpha^2$ | $\alpha$ | $\alpha$ | 1 | 1 | $\alpha^2$ | $\alpha^2$ | 1 |
| $\alpha^2$ | $\alpha$ | $\alpha$ | 1 | 1 | $\alpha^2$ | $\alpha^2$ | $\alpha$ | $\alpha$ | $\alpha^2$ |
| $\alpha$ | 1 | 1 | $\alpha^2$ | $\alpha^2$ | $\alpha$ | $\alpha$ | 1 | 1 | $\alpha^2$ |

FIG. 4C

Sector_A

| Time Orthogonalization Sequence | | | | | | | | | |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

FIG. 6A

Sector_B

| Time Orthogonalization Sequence | | | | | | | | | |
|---|---|---|---|---|---|---|---|---|---|
| 1 | 1 | $\varphi$ | $\varphi$ | $-1$ | $-1$ | $-\varphi$ | $-\varphi$ | 1 | 1 |
| 1 | $\alpha^2$ | $\varphi$ | $\varphi\alpha^2$ | $-1$ | $-\alpha^2$ | $-\varphi$ | $-\varphi\alpha^2$ | 1 | $\alpha^2$ |
| $\alpha$ | 1 | $\varphi\alpha$ | $\varphi$ | $-\alpha$ | $-1$ | $-\varphi\alpha$ | $-\varphi$ | $\alpha$ | 1 |
| $\alpha^2$ | $\alpha$ | $\varphi\alpha^2$ | $\varphi\alpha$ | $-\alpha^2$ | $-\alpha$ | $-\varphi\alpha^2$ | $-\varphi\alpha$ | $\alpha^2$ | $\alpha$ |
| 1 | $\alpha^2$ | $\varphi$ | $\varphi\alpha^2$ | $-1$ | $-\alpha^2$ | $-\varphi$ | $-\varphi\alpha^2$ | 1 | $\alpha^2$ |
| $\alpha$ | 1 | $\varphi\alpha$ | $\varphi$ | $-\alpha$ | $-1$ | $-\varphi\alpha$ | $-\varphi$ | $\alpha$ | 1 |
| $\alpha^2$ | $\alpha$ | $\varphi\alpha^2$ | $\varphi\alpha$ | $-\alpha^2$ | $-\alpha$ | $-\varphi\alpha^2$ | $-\varphi\alpha$ | $\alpha^2$ | $\alpha$ |
| 1 | $\alpha^2$ | $\varphi$ | $\varphi\alpha^2$ | $-1$ | $-\alpha^2$ | $-\varphi$ | $-\varphi\alpha^2$ | 1 | $\alpha^2$ |
| $\alpha$ | 1 | $\varphi\alpha$ | $\varphi$ | $-\alpha$ | $-1$ | $-\varphi\alpha$ | $-\varphi$ | $\alpha$ | 1 |
| $\alpha^2$ | $\alpha$ | $\varphi\alpha^2$ | $\varphi$ | $-\alpha^2$ | $-1$ | $-\varphi\alpha^2$ | $-\varphi$ | $\alpha^2$ | 1 |

FIG. 6B

Sector_C

| Time Orthogonalization Sequence | | | | | | | | | |
|---|---|---|---|---|---|---|---|---|---|
| 1 | 1 | $-\varphi$ | $-\varphi$ | $-1$ | $-1$ | $\varphi$ | $\varphi$ | 1 | 1 |
| 1 | $\alpha$ | $-\varphi$ | $-\varphi\alpha$ | $-1$ | $-\alpha$ | $\varphi$ | $\varphi\alpha$ | 1 | $\alpha$ |
| $\alpha^2$ | 1 | $-\varphi\alpha^2$ | $-\varphi$ | $-\alpha^2$ | $-1$ | $\varphi\alpha^2$ | $\varphi$ | $\alpha^2$ | 1 |
| $\alpha$ | $\alpha^2$ | $-\varphi\alpha$ | $-\varphi\alpha^2$ | $-\alpha$ | $-\alpha^2$ | $\varphi\alpha$ | $\varphi\alpha^2$ | $\alpha$ | $\alpha^2$ |
| 1 | $\alpha$ | $-\varphi$ | $-\varphi\alpha$ | $-1$ | $-\alpha$ | $\varphi$ | $\varphi\alpha$ | 1 | $\alpha$ |
| $\alpha^2$ | 1 | $-\varphi\alpha^2$ | $-\varphi$ | $-\alpha^2$ | $-1$ | $\varphi\alpha^2$ | $\varphi$ | $\alpha^2$ | 1 |
| $\alpha$ | $\alpha^2$ | $-\varphi\alpha$ | $-\varphi\alpha^2$ | $-\alpha$ | $-\alpha^2$ | $\varphi\alpha$ | $\varphi\alpha^2$ | $\alpha$ | $\alpha^2$ |
| 1 | $\alpha$ | $-\varphi$ | $-\varphi\alpha$ | $-1$ | $-\alpha$ | $\varphi$ | $\varphi\alpha$ | 1 | $\alpha$ |
| $\alpha^2$ | 1 | $-\varphi\alpha^2$ | $-\varphi$ | $-\alpha^2$ | $-1$ | $\varphi\alpha^2$ | $\varphi$ | $\alpha^2$ | 1 |
| $\alpha$ | 1 | $-\varphi\alpha$ | $-\varphi$ | $-\alpha$ | $-1$ | $\varphi\alpha$ | $\varphi$ | $\alpha$ | 1 |

FIG. 6C

Sector_B - Sector_A   Cross Products

FIG. 7A

Sector_C - Sector_A   Cross Products

FIG. 7B

Sector_C - Sector_B   Cross Products

FIG. 7C

Sector_A

| Time Orthogonalization Sequence | | | | | | | | | |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

FIG. 8A

Sector_B

| Time Orthogonalization Sequence | | | | | | | | | |
|---|---|---|---|---|---|---|---|---|---|
| 1 | $\gamma$ | $-1$ | $-\gamma$ | 1 | $\gamma$ | $-1$ | $-\gamma$ | 1 | $\gamma$ |
| 1 | | $-1$ | | 1 | | $-1$ | | 1 | |
| $\alpha$ | $-\varphi$ | $-\alpha$ | $\varphi$ | $\alpha$ | $-\varphi$ | $-\alpha$ | $\varphi$ | $\alpha$ | $-\varphi$ |
| $\alpha^2$ | $\gamma^2$ | $-\alpha^2$ | $-\gamma^2$ | $\alpha^2$ | $\gamma^2$ | $-\alpha^2$ | $-\gamma^2$ | $\alpha^2$ | $\gamma^2$ |
| 1 | $\varphi\gamma^2$ | $-1$ | $-\varphi\gamma^2$ | 1 | $\varphi\gamma^2$ | $-1$ | $-\varphi\gamma^2$ | 1 | $\varphi\gamma^2$ |
| $\alpha$ | $-\varphi$ | $-\alpha$ | $\varphi$ | $\alpha$ | $-\varphi$ | $-\alpha$ | $\varphi$ | $\alpha$ | $-\varphi$ |
| $\alpha^2$ | $\gamma^2$ | $-\alpha^2$ | $-\gamma^2$ | $\alpha^2$ | $\gamma^2$ | $-\alpha^2$ | $-\gamma^2$ | $\alpha^2$ | $\gamma^2$ |
| 1 | $\varphi\gamma^2$ | $-1$ | $-\varphi\gamma^2$ | 1 | $\varphi\gamma^2$ | $-1$ | $-\varphi\gamma^2$ | 1 | $\varphi\gamma^2$ |
| $\alpha$ | $-\varphi$ | $-\alpha$ | $\varphi$ | $\alpha$ | $-\varphi$ | $-\alpha$ | $\varphi$ | $\alpha$ | $-\varphi$ |
| $\alpha^2$ | $\gamma$ | $-\alpha^2$ | $-\gamma$ | $\alpha^2$ | $\gamma$ | $-\alpha^2$ | $-\gamma$ | $\alpha^2$ | $\gamma$ |

FIG. 8B

Sector_C

| Time Orthogonalization Sequence | | | | | | | | | |
|---|---|---|---|---|---|---|---|---|---|
| 1 | $\delta$ | $-1$ | $-\delta$ | 1 | $\delta$ | $-1$ | $-\delta$ | 1 | $\delta$ |
| 1 | | $-1$ | | 1 | | $-1$ | | 1 | |
| $\alpha^2$ | $\varphi$ | $-\alpha^2$ | $-\varphi$ | $\alpha^2$ | $\varphi$ | $-\alpha^2$ | $-\varphi$ | $\alpha^2$ | $\varphi$ |
| | $\delta$ | | $-\delta$ | | $\delta$ | | $-\delta$ | | $\delta$ |
| $\alpha$ | $-\gamma$ | $-\alpha$ | $\gamma$ | $\alpha$ | $-\gamma$ | $-\alpha$ | $\gamma$ | $\alpha$ | $-\gamma$ |
| 1 | $-\gamma$ | $-1$ | $\gamma$ | 1 | $-\gamma$ | $-1$ | $\gamma$ | 1 | $-\gamma$ |
| $\alpha^2$ | $\varphi$ | $-\alpha^2$ | $-\varphi$ | $\alpha^2$ | $\varphi$ | $-\alpha^2$ | $-\varphi$ | $\alpha^2$ | $\varphi$ |
| $\alpha$ | $\delta$ | $-\alpha$ | $-\delta$ | $\alpha$ | $\delta$ | $-\alpha$ | $-\delta$ | $\alpha$ | $\delta$ |
| 1 | $-\gamma$ | $-1$ | $\gamma$ | 1 | $-\gamma$ | $-1$ | $\gamma$ | 1 | $-\gamma$ |
| $\alpha^2$ | $\varphi$ | $-\alpha^2$ | $-\varphi$ | $\alpha^2$ | $\varphi$ | $-\alpha^2$ | $-\varphi$ | $\alpha^2$ | $\varphi$ |
| $\alpha$ | $\delta$ | $-\alpha$ | $-\delta$ | $\alpha$ | $\delta$ | $-\alpha$ | $-\delta$ | $\alpha$ | $\delta$ |

FIG. 8C

TIME ORTHOGONALIZATION OF REFERENCE SIGNALS

BACKGROUND

1. Field

The present disclosure relates generally to communications, and more particularly, to techniques for processing a reference signal in a wireless communications system.

2. Background

Wireless communication systems are widely deployed to provide various telecommunication services such as telephony, video, data, messaging, broadcasts, and so on. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

Wireless communication systems are generally designed to provide wireless access to a network (e.g., Internet) for multiple mobile stations within a geographic region. Access is provided by an access points, or base station, serving the geographic region. A base station is an apparatus having a radio transceiver to support a wireless access protocol (i.e., radio-based communication link) with multiple mobile stations. The wireless access protocol is generally defined by an industry standard that includes, among other things, the multiple-access system used by the base station to communicate with the mobile stations.

A base station is generally designed to serve a cell within the wireless communications systems. In many such systems, the cell is divided into multiple sectors. Typically, a base station deployed in one of these cells may have several transceivers that allow it to serve each section with a different antenna, or a different arrangement of antenna elements. With this configuration, a base station can form a directional beam to cover each sector of the cell, thereby reducing interference to mobile devices in neighboring cells. A typical base station is configured to serve three sectors with each antenna, or each arrangement of antenna elements, providing a 120° of coverage for one of the sectors.

A base station serving a cell generally broadcasts a reference signal in each sector. The reference signal, which is sometimes referred to as a pilot signal, a beacon, or the like, is a known signal that is used by the mobile stations for synchronization, equalization, channel estimation, and/or other purposes. In these systems, efficient methods are needed for distinguishing the reference signals broadcast within the different sectors while conserving valuable channel resources.

SUMMARY

In one aspect of the disclosure, an apparatus for providing wireless coverage to a plurality of sectors includes means for generating a reference sequence, and means for applying a time domain orthogonal sequence to the reference sequence to generate a reference signal for broadcasting over one of the sectors.

In another aspect of the disclosure, an apparatus for wireless communications within a sector includes means for receiving a broadcast within a sector, the received broadcast comprising a reference signal having a time domain orthogonal sequence applied to a reference sequence, and means for recovering the reference sequence from the received broadcast.

In yet another aspect of the disclosure, a method for providing wireless coverage to a plurality of sectors includes generating a reference sequence, and applying a time domain orthogonal sequence to the reference sequence to generate a reference signal for broadcasting over one of the sectors.

In a further aspect of the disclosure, a method for wireless communications within a sector includes receiving a broadcast within a sector, the received broadcast comprising a reference signal having a time domain orthogonal sequence applied to a reference sequence, and recovering the reference sequence from the received broadcast.

In yet a further aspect of the disclosure, an apparatus for providing wireless coverage to a plurality of sectors includes a processing system configured to generate a reference sequence, and apply a time domain orthogonal sequence to the reference sequence to generate a reference signal for broadcasting over one of the sectors.

In another aspect of the disclosure, an apparatus for wireless communications within a sector includes a processing system configured to receive a broadcast within a sector, the received broadcast comprising a reference signal having a time domain orthogonal sequence applied to a reference sequence, the processing system being further configured to recover the reference sequence from the received broadcast.

In yet another aspect of the disclosure, a machine readable medium includes code executable by a machine to generate a reference sequence, and apply a time domain orthogonal sequence to the reference sequence to generate a reference signal for broadcasting over one of the sectors.

In a further aspect of the disclosure, a machine readable medium includes code executable by a machine to receive a broadcast within a sector, the received broadcast comprising a reference signal having a time domain orthogonal sequence applied to a reference sequence, and recover the reference sequence from the received broadcast.

It is understood that other aspects of the invention will become readily apparent to those skilled in the art from the following detailed description, wherein it is shown and described only exemplary configurations of an apparatus for wireless communications. As will be realized, the invention includes other and different aspects of an apparatus for wireless communications and its several details are capable of modification in various other respects, all without departing from the spirit and scope of the invention. Accordingly, the drawings and the detailed description are to be regarded as illustrative in nature and not as restrictive.

BRIEF DESCRIPTION OF THE DRAWINGS

These and other aspects of the disclosure will be described in the detailed description that follows, and in the accompanying drawings, wherein:

FIGS. 3A-3C are conceptual diagrams representing three reference signals for broadcasting in different sectors of a base station, with each reference signal being modulated onto orthogonal frequency tones;

FIGS. 4A-4C are conceptual diagrams showing a different time orthogonal sequence being applied to each one of the three references shown in FIGS. 3A-3B, with each time orthogonal sequence having a period of six time symbols;

FIGS. 6A-6C are conceptual diagrams showing a different time orthogonal sequence being applied to each one of the three references shown in FIGS. 3A-3B, with each time orthogonal sequence having a period of eight time symbols;

FIGS. 7A-7C are conceptual diagrams showing the element-wise cross products between the three reference signal shown in FIGS. 6A-6C;

FIGS. 8A-8C are conceptual diagrams showing a different time orthogonal sequence being applied to each one of the three references shown in FIGS. 3A-3B, with each time orthogonal sequence having a period of four time symbols;

DETAILED DESCRIPTION

Various aspects of the invention are described more fully hereinafter with reference to the accompanying drawings. This invention may, however, be embodied in many different forms and should not be construed as limited to any specific structure or function presented in this disclosure. Rather, these aspects are provided so that this disclosure will be thorough and complete, and will fully convey the scope of the invention to those skilled in the art.

The detail description may include specific details to illustrate various aspects of the invention. However, it will be apparent to those skilled in the art that the invention may be practiced without these specific details. In some instances, well known elements may be shown in block diagram form, or omitted, to avoid obscuring the inventive concepts presented throughout this disclosure.

Figure 1:
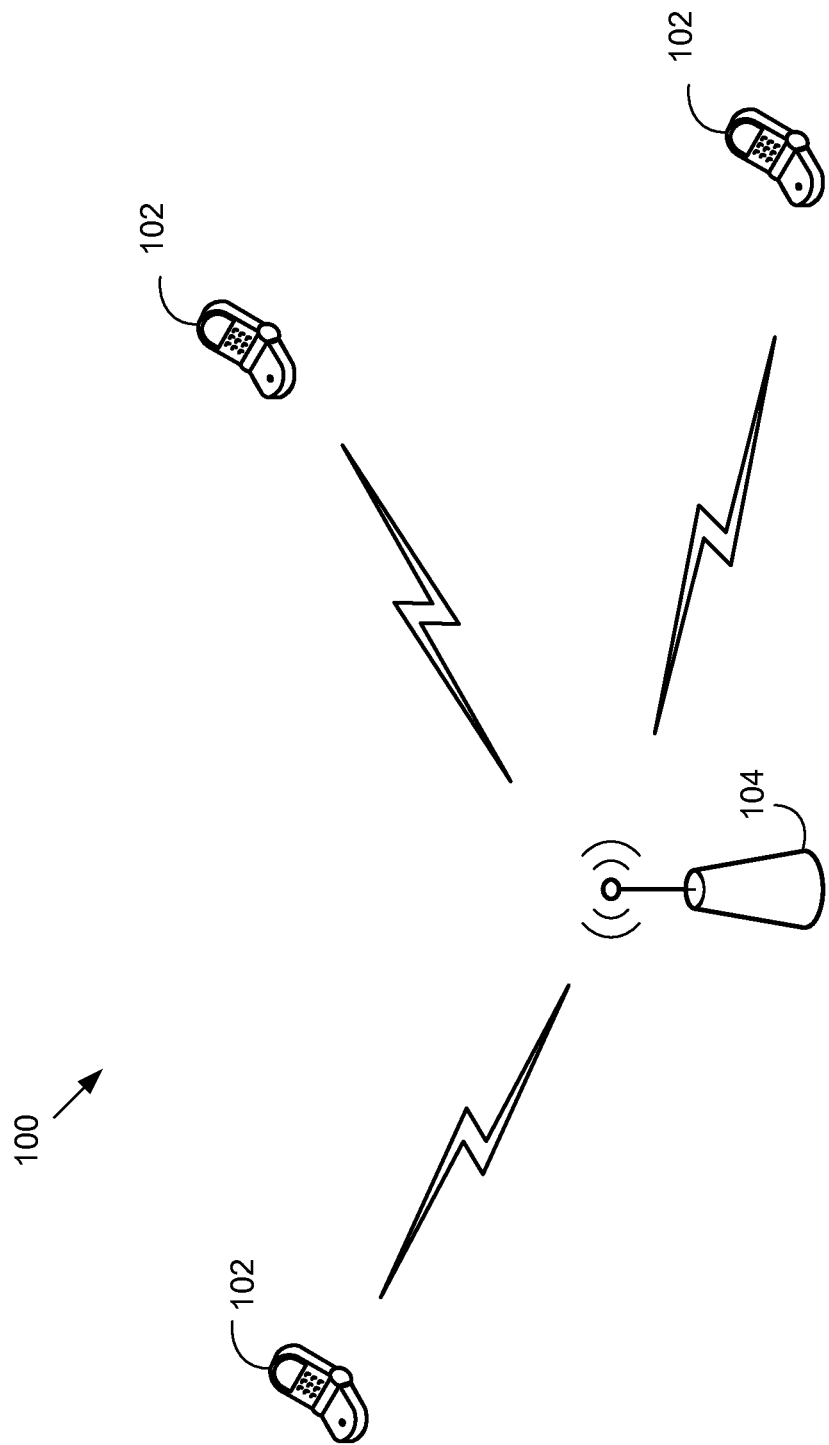
FIG. 1 is a conceptual diagram illustrating an example of a wireless communications system.

Several aspects of a wireless communications system will now be presented with reference to FIG. 1. The wireless system 100 is shown with several mobile stations 102 in communication with a base station 104. The mobile stations 102 are shown as are cellular phones, but may be cordless phones, smart phones, session initiation protocol (SIP) phones, laptops, personal digital assistants (PDAs), satellite radios, global positioning systems, multimedia devices, video devices, digital audio players (e.g., MP3 player), cameras, game consoles, or any other suitable device having wireless connection capability. A mobile station 102 may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, user equipment (UE), a user agent, a mobile client, a client, or some other suitable terminology. A base station 104 may be referred to as a base station, a base transceiver station, a radio base station, an access point, NodeB, eNodeB, a transceiver function, a radio router, a radio transceiver, a basic service set (BSS), an extended service set (ESS), or some other suitable terminology. The various concepts presented throughout this disclosure are intended to apply to all suitable entities regardless of their specific nomenclature.

The base station 104 may be configured to support any suitable wireless access protocol. By way of example, the base station 104 may support Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs multiple access techniques such as CDMA to provide broadband Internet access to mobile stations. Alternatively, the base station 104 may support Long Term Evolution (LTE), which is a project within the 3GPP2 to improve the Universal Mobile Telecommunications System (UMTS) mobile phone standard based primarily on a Wideband CDMA (W-CDMA) air interface. Then again, the base station 104 may support the WiMAX standard being developed by the WiMAX forum. The actual wireless access protocol employed by the base station 104 for any particular communications system will depend on the specific application and the overall design constraints imposed on the system. The various concepts presented throughout this disclosure are intended to apply to all suitable wireless communication systems regardless of the wireless access protocol supported by such systems.

The base station 104 includes several transceivers (not shown) which allows it to serve each section with a different antenna, or a different arrangement of antenna elements. With this configuration, the base station 104 can form a directional beam to cover each sector of a cell. As a result, mobile stations in neighboring cells may be subject to less interference as compared to a base station transmitting through a single antenna to all its mobile stations. In this example, the base station is configured to serve three sectors with each antenna, or each arrangement of antennas elements, providing a 120° of coverage for one sector.

Figure 2:
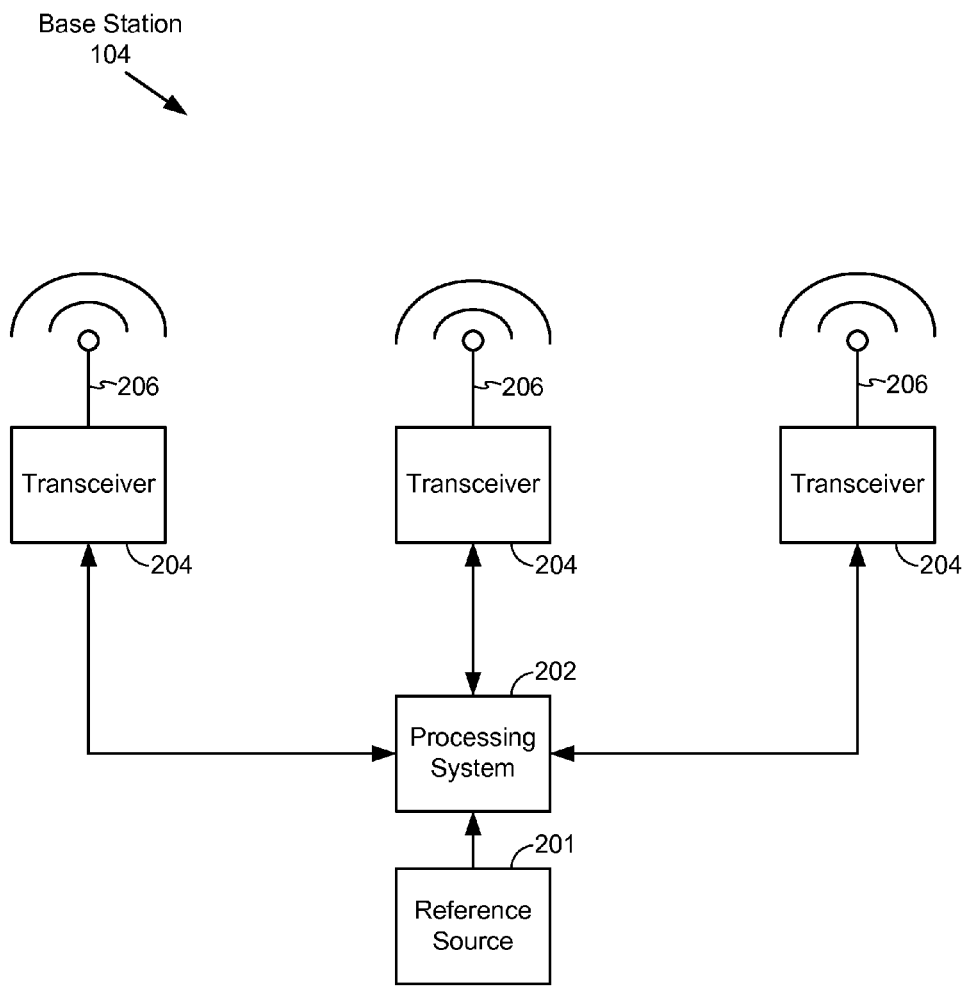
FIG. 2 is a conceptual block diagram illustrating an example of a hardware configuration for a base station.

Various aspects of a base station will now be presented with reference to FIG. 2. In this example, the base station 104 will be described for an LTE system. However, as those skilled in the art will readily appreciate, the various concepts presented throughout this disclosure may be extended to base stations supporting other wireless access protocols. The base station 104 is shown with a processing system 202 supporting multiple transceivers 204. Each transceiver 204 includes an antenna 206 comprising a plurality of radiating elements (not shown). The transceiver 204 and antenna 206 work together to form a directional beam to cover one sector of the area covered by the base station 104. Each transceiver 204 may be supported by a separate channel in the processing system 202 to support communications with mobile stations in the covered sector. Each transceiver 204, in this example, supports LTE using OFDMA in the downlink and SC-FDMA in the uplink. The downlink refers to transmissions from the base station 104 to the mobile stations and the uplink refers to transmissions from the mobile stations to the base station 104.

The processing system 202 may be configured to provide a separate reference signal to each transceiver 204 for broadcasting within the different sectors. The reference signals may be generated by the processing system 202 from a single reference source 201 as shown in FIG. 2, or multiple reference sources. The reference source(s) may be separate from the processing system 202, as shown in FIG. 2, or part of the processing system 202. In one configuration of a base station, the processing system 202 can use a reference signal that shares common resources. By way of example, the processing system 202 may use the same pseudorandom scrambling code for the reference signal and provide the reference signal to the individual transceivers 204 for broadcast at the same time using the same frequency. The processing system 202 may use a time shifted frequency domain orthogonal sequence for each reference signal to enable the mobile stations to distinguish them.

The three sequences can be represented by FIGS. 3A-3C. FIG. 3A represents the frequency domain orthogonal sequence for the reference signal broadcast by the base station in a first sector (Sector A), FIG. 3B represents the frequency domain orthogonal sequence for the reference signal broadcast by the base station in a second sector (Sector B), and FIG. 3C represents the frequency domain orthogonal sequence for the reference signal broadcast by the base station in a third sector (Sector C). In this example, the sequences are modulated onto tones or subcarriers, which are spaced apart at precise frequencies. The horizontal dimension represents time and the vertical dimension represents frequency. Each vertical column represents the tones of a time symbol carrying the reference signal. The time symbol may be referred to in this example as an OFDM symbol, but may be referred to by other nomenclature by those skilled in the art. Each frequency domain orthogonal sequence represents a phase multiplier, where $\alpha=e^{2\pi j/3}$ is the $3^{rd}$ root of one. Although not shown, there may be spacing between the tones and time symbols. In one configuration, for example, there may be six tones between each tone carrying a reference sequence value and three or four time symbols between each time symbol carrying reference sequence values. When a mobile station processes the reference signal broadcast by its serving sector, it multiplies each frequency tone of the received signal by the complex conjugate of a locally generated replica of the reference signal. When all reference signal tones are of the same magnitude then this operation can be performed by subtracting the phase of the locally generated replica of the reference signal from the phase of the received signal. When both the received signal and the reference signal are from the set $\{1,\alpha,\alpha^2\}$ then the phase subtraction becomes equivalent to choosing a value z in Table 1 corresponding to the received signal phase x and reference signal phase y.

TABLE 1

Phase look up values

| $z = x \cdot y^*$ | | y | |
|---|---|---|---|
| | 1 | $\alpha$ | $\alpha^2$ |
| x  1 | 1 | $\alpha^2$ | $\alpha$ |
| $\alpha$ | $\alpha$ | 1 | $\alpha^2$ |
| $\alpha^2$ | $\alpha^2$ | $\alpha$ | 1 |

In order to reduce reference signal multi-sector path ambiguity, a time domain orthogonal sequence may be introduced in addition to, or instead of, the frequency domain orthogonal sequence shown in FIGS. 3A-3C. A time domain orthogonal sequence may be applied by multiplying the tones of any given time symbol with a constant value from a time domain orthogonal sequence. The time domain orthogonal sequence may be different for each reference signal.

In one configuration of a processing system 202 (see FIG. 2), three time domain orthogonal sequences may be applied to three frequency domain sequences, resulting in nine different sequences for the reference signal. Alternatively, the processing system 202 may be configured to use three frequency domain orthogonal sequences for the reference signal and use the added number of dimensions to introduce flexibility in the despreading operation. Several examples will now be presented to further illustrate this latter concept.

Three frequency domain sequences can be represented by FIGS. 4A-4C, with FIG. 4A representing the frequency domain orthogonal sequence for the reference signal broadcast by the base station in Sector A, FIG. 4B representing the frequency domain orthogonal sequence for the reference signal broadcast by the base station in Sector B, and FIG. 4C representing the frequency domain orthogonal sequence for the reference signal broadcast by the base station in Sector C. A time domain orthogonal sequence, which repeats every sixth time symbol, is applied to each of the frequency domain orthogonal sequences.

A mobile station located within a sector will receive a broadcast containing the reference signal for that sector and interference. The interference may include, among other things, the reference signal broadcasts for the other sectors. In a manner to be described in greater detail later, the mobile station despreads the broadcast to recover the reference signal for the sector of interest. Because of the time domain orthogonal sequence, the despreading of the reference signal attenuates, or effectively cancels, the portion of the interference comprising the reference signals broadcast by the other sectors.

Figure 5A:
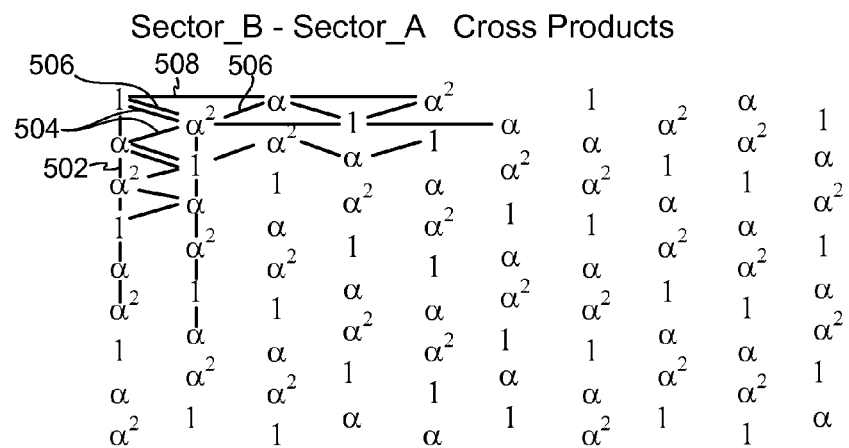
FIGS. 5A-5C are conceptual diagrams showing the element-wise cross products between the three reference signal shown in FIGS. 4A-4C.
Figure 5B:
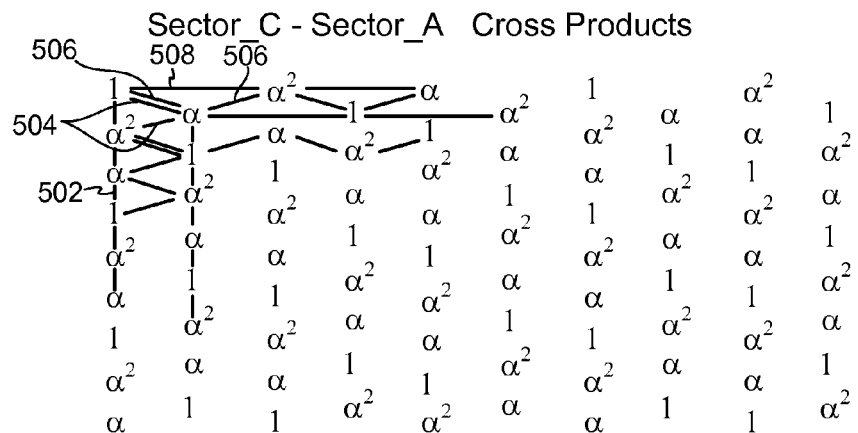
Figure 5C:
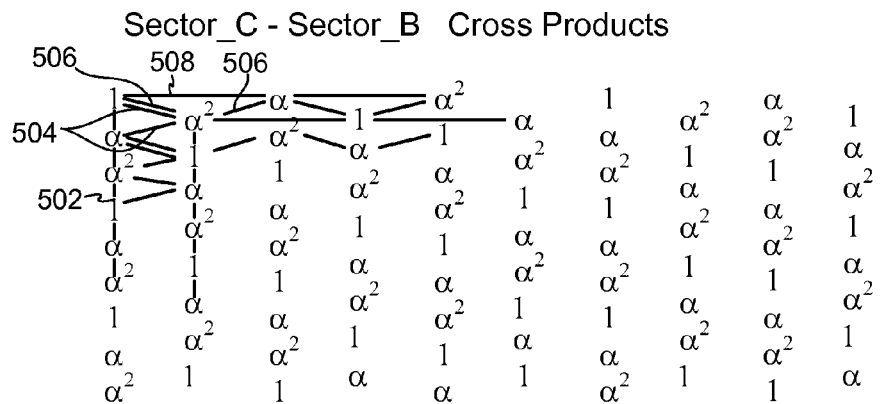

The ability to attenuate the reference signals broadcast by the other sectors through a despreading operation will be illustrated with reference to FIGS. 5A-5C, which show the element-wise cross products between the three reference signal broadcasts. FIG. 5A shows the element-wise cross products for Sector B—Sector A, which represents the reference signal broadcast for Sector B that is received by a mobile station in Sector A. The mobile station in Sector A removes the scrambling of the Sector A reference signal by performing a complex conjugate multiplication by a locally generated replica of the Sector A reference signal. When the received signal is the reference signal of Sector B then the result of that operation is as shown in FIG. 5A, which can be obtained by using Table 1 with setting x to the reference signal of Sector B as given in FIG. 4B, setting y to the reference signal of Sector A as given in FIG. 4A, and retrieving z as the element-wise cross product from Table 1. FIG. 5B shows the element-wise cross products for Sector C—Sector A, which represents the reference signal broadcast for Sector C that is received by a mobile station in Sector A, and FIG. 5C shows the element-wise cross products for Sector C—Sector B, which represents the reference signal broadcast for Sector C that is received by a mobile station in Sector B.

Referring to FIG. 5A, the element-wise cross products may be despread in the frequency domain, either across multiple tones of the same time symbol, as shown by reference designation 502, or across multiple tones in multiple time symbols, as shown by reference designation 504. Alternatively, the element-wise cross products may be despread in the time domain, either across multiple tones of multiple time symbols, as shown by reference designation 506, or across the same tones of multiple time symbols, as shown by reference designation 508. Regardless of the specific despreading algorithm, one can readily see that the despreading of the element-wise cross products in FIG. 5A results in a zero value. A similar result may be obtained for the element-wise cross products in FIGS. 5B and 5C. Thus, by way of example, a mobile station located in Sector A will receive a broadcast containing the reference signal for sector A, the reference signal for Sector B (represented by FIG. 5A), and the reference signal for Sector C (represented by FIG. 5B). When the broadcast is despread, the value of the reference signals for Sectors B and C become zero, leaving the reference signal for Sector A for downstream processing. In these examples, the despreading length, i.e. the number of element-wise cross product terms added together to get a single despread element, is three or an integer multiple of three.

The mobile station may be configured to selectively determine the despreading operation based on one or more wireless channel conditions. By way of example, the despreading operation may be selected based on the severity of the channel Doppler spread and the channel time dispersion. In this example, the element-wise cross products may be despread in frequency when the delay spread is low and the Doppler spread is high. Conversely, the element-wise cross products may be despread in time when the delay spread is high and the Doppler spread is low. When the element-wise cross product is being despread in frequency, the element-wise cross product may switch from despreading multiple tones of the same time symbol, as shown by reference designation 502, to despreading across multiple tones in multiple time symbols, as shown by reference designation 504, as the delay spread increases and the Doppler spread decreases. When the element-wise cross product is being despread in time, the element-wise cross product may switch from despreading multiple tones of multiple time symbols, as shown by reference designation 506, to despreading the same tones of multiple time symbols, as shown by reference designation 508, when the delay spread increases and the Doppler spread decreases.

As described above, a time domain orthogonal sequence having a six time symbol period may be useful in recovering the reference signal from the base station broadcast. However, in some configurations, time domain orthogonal sequences with other time periods may be beneficial. By way of example, it may be beneficial if the time period associated with a downlink radio frame is an integer multiple of the time domain orthogonal sequence length. Thus, the period of the time domain orthogonal sequence may be different depending on the particular application and the overall design constraints imposed on the system.

An example of a time domain orthogonal sequence with an 8 time symbol period is shown in FIGS. 6A-6C, with FIG. 6A representing the frequency domain orthogonal sequence for the reference signal broadcast by the base station in Sector A, FIG. 6B representing the frequency domain orthogonal sequence for the reference signal broadcast by the base station in Sector B, and FIG. 6C representing the frequency domain orthogonal sequence for the reference signal broadcast by the base station in Sector C. A time domain orthogonal sequence, which repeats every eighth time symbol, is applied to each of the frequency domain orthogonal sequences. The value $\phi$ in FIGS. 6B and 6C is an arbitrary complex value of unit amplitude.

The element-wise cross products between the three reference signals are shown in FIGS. 7A-7C. FIG. 7A shows the element-wise cross products for Sector B—Sector A, which represents the reference signal broadcast for Sector B that is received by a mobile station in Sector A, FIG. 7B shows the element-wise cross products for Sector C—Sector A, which represents the reference signal broadcast for Sector C that is received by a mobile station in Sector A, and FIG. 7C shows the element-wise cross products for Sector C—Sector B, which represents the reference signal broadcast for Sector C that is received by a mobile station in Sector B. Similar to FIGS. 5A-5C, one can readily see that the despreading of the element-wise cross products in FIGS. 7A-7C result in zero values.

In this example, the element-wise cross products may be despread in three or four different ways dependent on the particular sequence pair. By way of example, the cross products in FIGS. 7A and 7B may be despread in the frequency domain, either across multiple tones of the same time symbol, as shown by reference designation 702, or across multiple tones in multiple time symbols, as shown by reference designation 704, or in the time domain across the same tones of multiple time symbols, as shown by reference designation 706. The cross products in FIG. 7C may be despread in the frequency domain, either across multiple tones of the same time symbol, as shown by reference designation 702, or across multiple tones in multiple time symbols, as shown by reference designation 704, or in the time domain across, either across multiple tones of multiple time symbols, as shown by reference designation 708, or across the same tones of multiple time symbols, as shown by reference designation 706.

In certain high Doppler spread environments, the eight time symbol period may be susceptible to loss of time domain orthogonality. In those cases, a shorter time domain orthogonal sequence may be used as shown in FIGS. 8A-8C. The following notation is used: $\gamma=-j\alpha=e^{2\pi j/12}$ and $\delta=1/\gamma=j\alpha^2=e^{-2\pi j/12}$ (i.e. $\gamma$, $\delta$ are $12^{th}$ roots of unity).

Figure 9A:
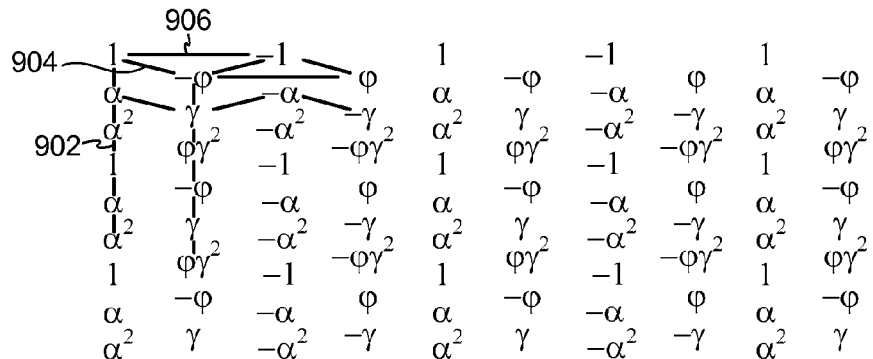
FIGS. 9A-9C are conceptual diagrams showing the element-wise cross products between the three reference signal shown in FIGS. 8A-8C.
Figure 9B:
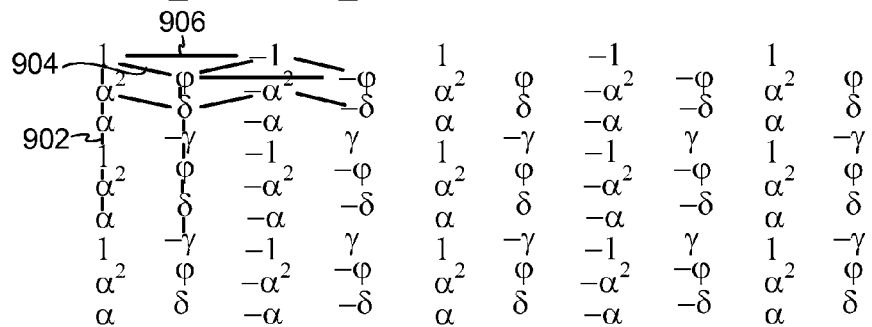
Figure 9C:
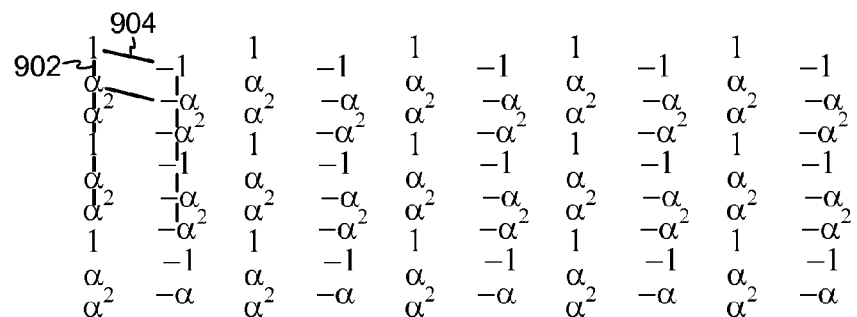

The element-wise cross products between the three reference signals are shown in FIGS. 9A-9C. FIG. 9A shows the element-wise cross products for Sector B—Sector A, which represents the reference signal broadcast for Sector B that is received by a mobile station in Sector A, FIG. 9B shows the element-wise cross products for Sector C—Sector A, which represents the reference signal broadcast for Sector C that is received by a mobile station in Sector A, and FIG. 9C shows the element-wise cross products for Sector C—Sector B, which represents the reference signal broadcast for Sector C that is received by a mobile station in Sector B. Similar to FIGS. 5A-5C, one can readily see that the despreading of the element-wise cross products in FIGS. 9A-9C result in zero values.

In this example, the element-wise cross products may be despread in two or four different ways depending on the particular sequence pair. By way of example, the cross products in FIGS. 9A and 9B may be despread in the frequency domain, either across multiple tones of the same time symbol, as shown by reference designation 902, or across multiple tones in multiple time symbols, as shown by reference designation 904, or in the time domain across the same tones of multiple time symbols, as shown by reference designation 906. The cross products in FIG. 9C may be despread in the frequency domain, either across multiple tones of the same time symbol, as shown by reference designation 902, or across multiple tones in multiple time symbols, as shown by reference designation 904, or in the time domain across, either across multiple tones of multiple time symbols, as shown by reference designation 908, or across the same tones of multiple time symbols, as shown by reference designation 906.

Each example presented above may provide flexibility in terms of selection of time domain or frequency domain despreading or a combination thereof. Such selection capability may be useful when the wireless channels of the different mobile stations served by a sector can be a mix of high Doppler, low Doppler and high delay spread, low delay spread environments. The decision regarding the despreading option may be made within the mobile station based on the observed channel conditions without any assistance from the base station. Alternatively, the base station may provide information based on a priori known channel conditions and/or deployment topology. By way of example, a base station sector covering a railway or highway may provide different information to the mobile station regarding the preferred despreading operation than a base station sector providing indoor coverage.

Figure 10:
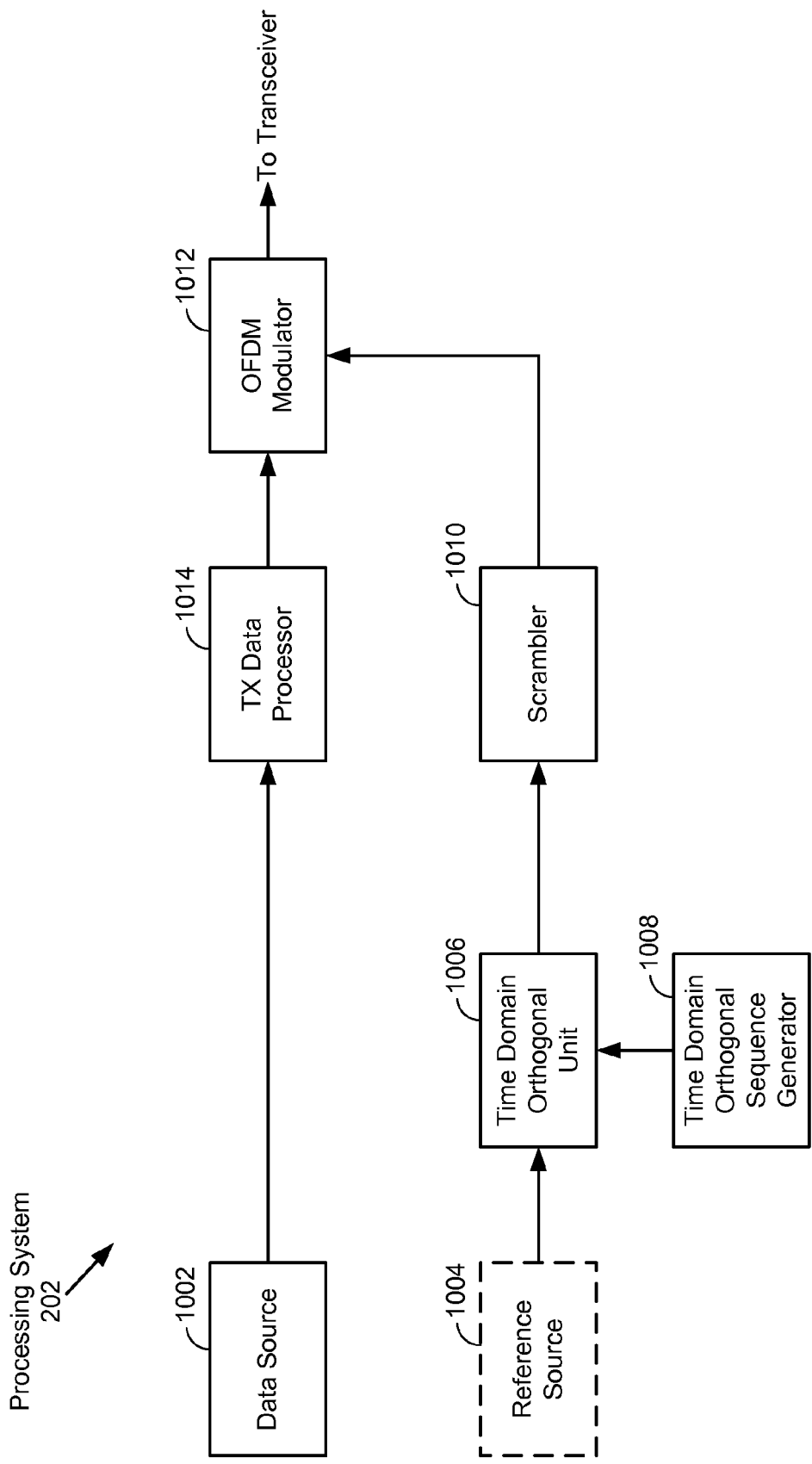
FIG. 10 is a conceptual block diagram illustrating an example of the functionality of a channel of a processing system in a base station.

Various aspects of a processing system for a base station will now be presented. The processing system may be configured as a multi-channel processing system with a separate channel for each sector of the cell that it serves. The functionality of the processing system for a single channel will be described in connection with FIG. 10. The same functionality may be implemented for the other channels. Alternatively, the other channels may have variations in functionality that will be readily apparent to those skilled in the art from the teachings throughout this disclosure. FIG. 10 is a conceptual block diagram showing the transmitter function for a single channel of a processing system. However, as those skilled in the art will readily appreciate, the processing system channel may also include a receiving function for uplink communications.

The processing system 202 is shown with a data source 1002 and a reference source 1004. The reference source 1002 is shown with phantom lines to illustrate that it may be part of the processing system 202, or external to the processing system 202 as shown in FIG. 2. The reference source 1004 provides a means for generating a reference sequence. In one configuration of the processing system 202, the reference source 1004 may be configured to generate a reference sequence from a 3-point signal constellation. The reference sequence may be provided to a time domain orthogonal unit 1006 for further processing.

The time domain orthogonal unit 1006 provides a means to applying a time domain orthogonal sequence to the reference sequence for generating a reference signal for broadcast over a sector of the cell. The time domain orthogonal unit 1006 splits the reference sequence into parallel streams with each stream carrying a reference sequence value for a specific period of time. The reference sequence values carried by the parallel stream for any given time period constitutes a time symbol. The time domain orthogonal unit 1006 may be configured to multiply a constant value from a time domain orthogonal sequence with each reference sequence value in a time symbol. The time domain orthogonal sequence may be provided to the time domain orthogonal unit 1006 by a time domain orthogonal sequence generator 1008, which provides a different constant value to the time domain orthogonal unit 1006 for each time symbol. As described in greater detail earlier, the time domain orthogonal sequence may have a period of four time symbols, six time symbols, eight time symbols, or any other suitable time period.

The output from the time domain orthogonal unit 1006 may be provided to a scrambler 1010. The scrambler 1010 provides a means for scrambling the reference signal. This may be achieved by multiplying the reference signal by a pseudorandom scrambling sequence which is generally unique to the base station. Although the scrambler 1010 is shown following the time domain orthogonal unit 1006, the reference sequence may be scrambled before the time domain reference sequence is applied. In some configurations of a processing system, the scrambling function may be omitted.

The scrambled reference signal may be provided to an OFDM modulator 1012. The OFDM modulator 1012 provides a means for modulating the reference signal onto a plurality of orthogonal frequency tones or subcarriers. This may be achieved by mapping the parallel streams created by the time domain orthogonal unit 1006 to the frequency tones and then combining the modulated tones together using an Inverse Fast Fourier Transform (IFFT) to produce a reference signal in the form of a time domain OFDM symbol stream.

The OFDM modulator 1012 may also provide a multiplexing function that enables data (e.g., traffic, overhead, control signals, etc.) to be multiplexed with the reference signal in time and/or frequency. In this example, the data source 1002 provides data to a transmitter (TX) data processor 1014 that provides various physical layer signal processing functions. By way of example, the TX data processor 1014 may encode the data to facilitate forward error correction (FEC) at the mobile station and provide signal constellation mapping. The TX data processor 1014 may also provide a scrambling function similar to that described in connection with the reference signal.

The processed data from the TX data processor 1014 may be provided to the OFDM modulator 1012 for multiplexing with the reference signal in time and/or frequency. In this example, each OFDM symbol may include a set of tones carrying the reference signal and another set of tones carrying the processed data. Alternatively, all the tones of one or more OFDM symbols may be used to carry the reference signal and all the tones of the remaining OFDM symbols in a transmission frame may be used to carry the processed data. Any combination of the two multiplexing schemes may be used in other configurations of a processing system. The output from the OFDM modulator 1012 may be provided to the appropriate transceiver 204 (see FIG. 2) for modulating an RF carrier for transmission over the sector.

Figure 11:
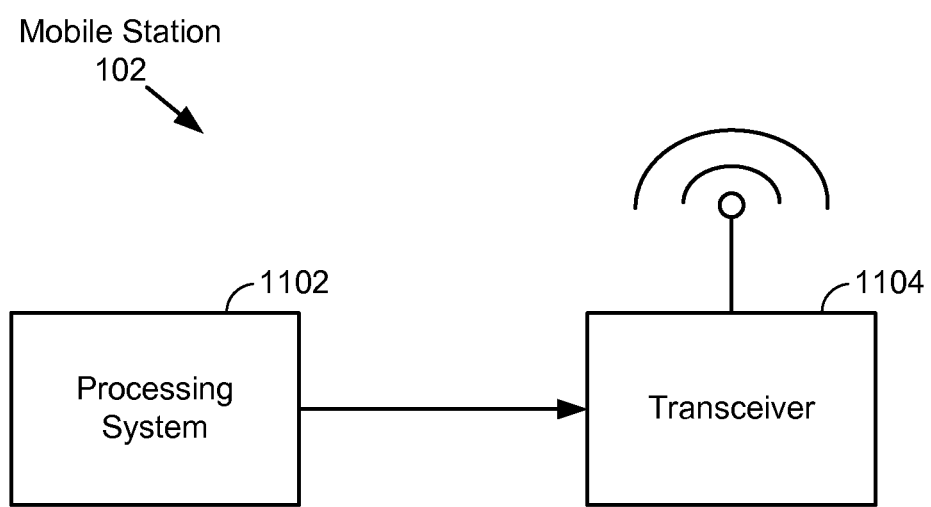
FIG. 11 is a conceptual block diagram illustrating an example of a hardware configuration for a mobile station.

An example of a mobile station will now be presented with reference to FIG. 11. In this example, the mobile station will be described for an LTE system. However, as those skilled in the art will readily appreciate, the various concepts presented throughout this disclosure may be extended to mobile stations supporting other wireless access protocols. The mobile station is shown with a processing system 1102 supporting a transceiver 1104. The transceiver 1104 provides a means for receiving a broadcast within a sector of a base station. The broadcast includes, among other things, the reference signal for the sector. As described in greater detail earlier, the reference signal comprises a time domain orthogonal sequence applied to a reference sequence. The processing system 1102 provides a means for recovering the reference sequence from the received broadcast.

Figure 12:
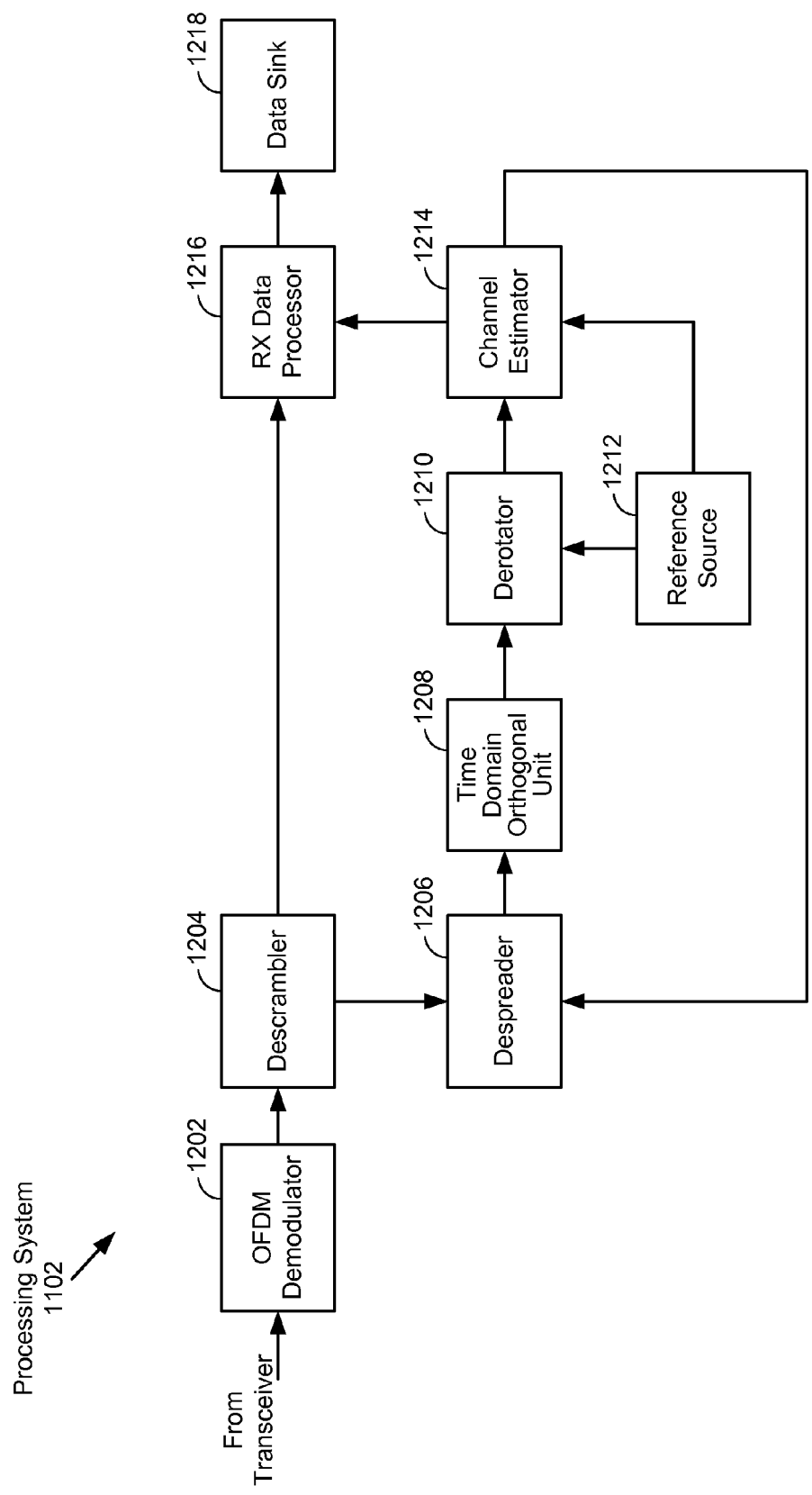
FIG. 12 is a conceptual block diagram illustrating an example of the functionality of a processing system in a mobile station.

Various aspects of a processing system for a mobile station will now be presented with reference to FIG. 12. FIG. 12 is a conceptual block diagram showing the receiver function of the processing system, however, as those skilled in the art will readily appreciate, the processing system may also include a transmitting function for downlink communications.

The processing system 1102 includes an OFDM demodulator 1202 configured to receive a time domain OFDM symbol stream recovered from an RF carrier by the transceiver 1104 (see FIG. 11). The OFDM demodulator 1202 provides a means for recovering the reference signal modulated onto the tones of the OFDM symbols by converting the OFDM symbol stream from the time domain to the frequency domain using a Fast Fourier Transform (FFT).

The signal output from the OFDM demodulator 1202 may be provided to a descrambler 1204. In systems employing scrambling codes, the descrambler 1204 provides a means for descrambling the reference signal. This may be achieved by multiplying the received broadcast with the same scrambling code used by the base station.

The descrambled signal output from the descrambler 1204 may be provided to a despreader 1206. As explained in greater detail earlier, the despreader 1206 provides a means for despreading the received broadcast to attenuate interference (i.e., reference signals broadcast over adjacent sectors).

The signal output from the despeader 1206 may be provided to a time domain orthogonal unit 1208. The time domain orthogonal unit 1208 provides a means for recovering the reference sequence from the reference signal by multiplying the inverse of the time domain orthogonal sequence applied at the base station to the received broadcast. Once the time domain orthogonal sequence has been removed, the received broadcast may be provided to a derotator 1210 to locate the reference signal.

The derotator 1210 may be used to remove the phase component from the reference sequence. The same reference sequence used by the base station to generate the reference signal may be generated by a reference source 1212 and used to derotate the signal to locate the reference sequence in the received broadcast. The descrambler 1204 and the derotator 1210 perform similar functions and in certain mobile station implementations, it may be sufficient to use either the descrambler 1204 or the derotator 1210 instead of using both.

Once the reference signal is located, a channel estimator 1214 may be used to estimate wireless channel conditions. Since the reference sequence is known, a priori, that channel estimator 1214 can employ known algorithms to determine various channel parameters by comparing the reference sequence generated by the reference source 1212 to the reference sequence recovered from the portion of the received broadcast carrying the reference signal.

The channel estimate computed by the channel estimator 1214 may be provided to a receive (RX) data processor 1216. The RX data processor 1214 may use the channel estimate to translate the data contained in the received broadcast back to the correct points in the signal constellation. This is achieved by first correcting the data for noise and other disturbances in the wireless channel, and then selecting data points in the signal constellation that were most likely transmitted. The latter is achieved by finding the smallest distance between the corrected data and a valid data point in the signal constellation. These soft decisions may be used, in the case of Turbo codes, to compute Log-Likelihood Ratios (LLRs). The RX data processor 1214 then uses the LLRs to decode the data in the received broadcast before providing the data to a data sink 1218.

In one configuration of a processing system for a mobile station, the channel estimate may be fed back to the despreader 1206 to select a despreading opedration. As explained in greater detail earlier, the mobile station may be capable of selecting a despreading operation based on various channel conditions. By way of example, the despreading operation may be selected based on the severity of channel Doppler spread and channel time dispersion, with the received broadcast being despread in frequency when the delay spread is low and the Doppler is high and despread in time when the delay spread is high and the Doppler is low. The channel estimator 1214 provides a means for determining the channel conditions that may be used by the despreader 1206 to determine the despreading operation.

In describing a wireless communications system, various aspects of a base station and mobile station have been described in terms of a processing system performing various functions. This functionality may be implemented as electronic hardware, software, or combinations of both. Whether such functionality is implemented as electronic hardware or software depends upon the particular application and design constraints imposed on the overall system. Skilled artisans may implement the described functionality in varying ways for each particular application.

By way of example, and without limitation, the processing system employed by the base station or the mobile station may be implemented with one or more processors. Examples of processors include microprocessors, a microcontrollers, Digital Signal Processors (DSPs), Field Programmable Gate Arrays (FPGAs), a Programmable Logic Devices (PLDs), controllers, state machines, gated logic, discrete hardware components, or any other processing circuit that can perform the various functionalities described throughout this disclosure.

A processor may be configured to execute software. An example of processor capable of executing software is a microprocessor capable of accessing software on machine-readable media. The microprocessor may be an integrated circuit linked together with machine-readable media and other circuitry through a bus or other communication means. Alternatively, the microprocessor may be part of an embedded system implemented with an Application Specific Integrated Circuit (ASIC). The embedded microprocessor may be an ARM (Advanced RISC Machine) processor with machine-readable media and other circuitry integrated into a single chip. In either configuration, the processor may be used to implement portions of the data source in the base station or the data sink in the mobile station that provides data processing above the physical layer. The physical layer processing, which includes the generation of the reference signal at the base station and the detection of the reference signal at the mobile station, may be also be performed by the processor, or alternatively the other circuitry. The other circuitry may include one or more DSPs, FPGAs, PLDs, controllers, state machines, gated logic, discrete hardware components, and/or or any other suitable processing circuits that can perform physical layer processing.

Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The machine-readable media may be part of the processing system. Alternatively, any portion of the machine-readable media may be external to the processing system. By way of example, the machine-readable media may include a transmission line, a carrier wave modulated by data, and/or a computer product separate from the base station or the mobile station, all which may be accessed by the processor system through the transceiver or by other means.

The software supported by the machine-readable media may reside in a single storage device or distributed across multiple memory devices. By way of example, software may be loaded into RAM from a hard drive. During execution of the software, the processor may load some of the instructions into cache to increase access speed. One or more cache lines may then be loaded into a general register file for execution by the processor. When referring to the functionality of a software, it will be understood that such functionality is implemented by the processor when executing software instructions.

Figure 13:
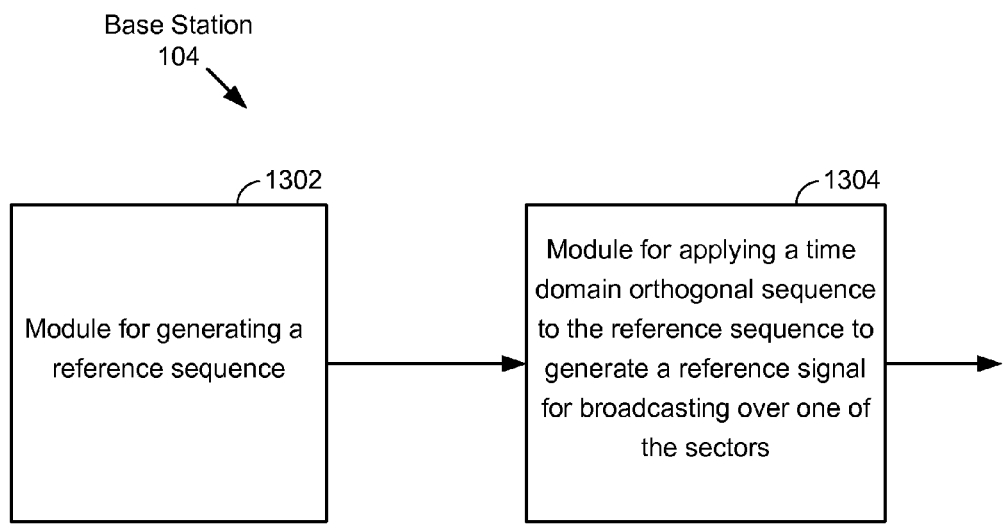
FIG. 13 is a functional block diagram illustrating an example of a base station.

FIG. 13 is a conceptual diagram illustrating various functionality of a base station. The base station 1300 includes a module 1302 for generating a reference sequence, and a module 1304 for applying a time domain orthogonal sequence to the reference sequence to generate a reference signal for broadcasting over one of the sectors.

Figure 14:
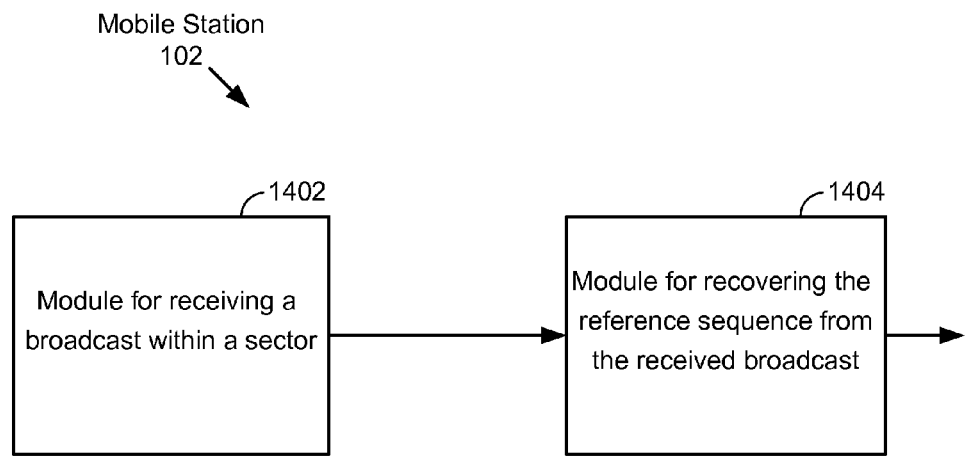
FIG. 14 is a functional block diagram illustrating an example of a mobile station.

FIG. 14 is a conceptual diagram illustrating various functionality of a mobile station. The mobile station 1400 includes a module 1402 for receiving a broadcast within a sector, the received broadcast comprising a reference signal having a time domain orthogonal sequence applied to a reference sequence, and a module 1404 for recovering the reference sequence from the received broadcast.

It is understood that any specific order or hierarchy of steps described in the context of a software module is being presented to provide an examples of a wireless node. Based upon design preferences, it is understood that the specific order or hierarchy of steps may be rearranged while remaining within the scope of the invention.

Although various aspects of the present invention have been described as software implementations, those skilled in the art will readily appreciate that the various software modules presented throughout this disclosure may be implemented in hardware, or any combination of software and hardware. Whether these aspects are implemented in hardware or software depends upon the particular application and design constraints imposed on the overall system. Skilled artisans may implement the described functionality in varying ways for each particular application, but such implementation decisions should not be interpreted as causing a departure from the scope of the invention.

The previous description is provided to enable any person skilled in the art to fully understand the full scope of the invention. Modifications to the various configurations disclosed herein will be readily apparent to those skilled in the art. Thus, the claims are not intended to be limited to the various aspects of the invention described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for providing wireless coverage to a plurality of sectors, comprising:
   generating a reference sequence;
   applying a time domain orthogonal sequence to the reference sequence to generate a reference signal for broadcasting over one of the plurality of sectors, wherein applying the time domain orthogonal sequence comprises:
      splitting the reference signal into parallel streams with each stream carrying a reference sequence value for a period of time, the reference sequence values together constituting a time symbol; and
      multiplying reference sequence values in different time symbols with a different constant value;
   generating the reference signal based at least in part on the application of the time domain orthogonal sequence to the reference sequence; and
   broadcasting the reference signal over one of the plurality of sectors.

2. The method of claim 1 further comprising applying one or more additional time domain orthogonal sequences to the reference sequence to generate one or more additional reference signals for broadcasting each one of the one or more additional reference signals over a different one of the plurality of sectors.

3. The method of claim 1 wherein the time domain orthogonal sequence is applied to the reference sequence by multiplying the time domain sequence with the reference sequence.

4. The method of claim 1 further comprising modulating the reference signal onto a plurality of orthogonal frequency tones.

5. The method of claim 1 further comprising scrambling the reference signal.

6. The method of claim 1 wherein the reference sequence comprises a sequence from a multipoint signal constellation.

7. The method of claim 1 wherein generating comprises generating the reference sequence as frequency domain orthogonal to other reference sequences across the plurality of sectors.

8. An apparatus for providing wireless coverage to a plurality of sectors, comprising:
   a processing system configured to:
      generate a reference sequence;
      apply a time domain orthogonal sequence to the reference sequence to generate a reference signal for broadcasting over one of the plurality of sectors, wherein applying the time domain orthogonal sequence comprises:
         splitting the reference signal into parallel streams with each stream carrying a reference sequence value for a period of time, the reference sequence values together constituting a time symbol; and
         multiplying reference sequence values in different time symbols with a different constant value;
      generate the reference signal based at least in part on the application of the time domain orthogonal sequence to the reference sequence; and
      broadcast the reference signal over one of the plurality of sectors.

9. A non-transitory machine readable medium having code executable by a machine to:
   generate a reference sequence;
   apply a time domain orthogonal sequence to the reference sequence to generate a reference signal for broadcasting over one of the plurality of sectors, wherein applying the time domain orthogonal sequence comprises:
      splitting the reference signal into parallel streams with each stream carrying a reference sequence value for a period of time, the reference sequence values together constituting a time symbol; and
      multiplying reference sequence values in different time symbols with a different constant value;
   generate the reference signal based at least in part on the application of the time domain orthogonal sequence to the reference sequence; and
   broadcast the reference signal over one of the plurality of sectors.

10. An apparatus for providing wireless coverage to a plurality of sectors, comprising:
    means for generating a reference sequence;
    means for applying a time domain orthogonal sequence to the reference sequence to generate a reference signal for broadcasting over one of the plurality of sectors, wherein the means for applying the time domain orthogonal sequence applies the time domain orthogonal sequence to the reference sequence by:
  splitting the reference signal into parallel streams with each stream carrying a reference sequence value for a period of time, the reference sequence values together constituting a time symbol; and
  multiplying reference sequence values in different time symbols with a different constant value;
means for generating the reference signal based at least in part on the application of the time domain orthogonal sequence to the reference sequence; and
means for broadcasting the reference signal over one of the plurality of sectors.

11. The apparatus of claim 10 further comprising means for applying one or more additional time domain orthogonal sequences to the reference sequence to generate one or more additional reference signals for broadcasting each one of the one or more additional reference signals over a different one of the plurality of sectors.

12. The apparatus of claim 10 wherein the means for applying a time domain orthogonal sequence to the reference sequence includes a multiplier for multiplying the time domain sequence with the reference sequence.

13. The apparatus of claim 10 further comprising means for modulating the reference signal onto a plurality of orthogonal frequency tones.

14. The apparatus of claim 10 further comprising means for scrambling the reference signal.

15. The apparatus of claim 10 wherein the reference sequence comprises a sequence from a multipoint signal constellation.

16. The apparatus of claim 1 wherein the means for generating generates the reference sequence as frequency domain orthogonal to other reference sequences across the plurality of sectors.

17. A method for wireless communications within a sector, comprising:
  receiving a broadcast within a sector, the received broadcast comprising a reference signal having a time domain orthogonal sequence applied to a reference sequence by splitting the reference signal into parallel streams with each stream carrying a reference sequence value for a period of time, the reference sequence values together constituting a time symbol, and by multiplying reference sequence values in different time symbols with a different constant value;
  recovering the reference sequence from the received broadcast; and
  decoding data in the received broadcast based at least in part on the reference sequence.

18. The method of claim 17 wherein the received broadcast further includes interference comprising one or more additional reference signals broadcast over one or more different sectors.

19. The method of claim 18 wherein the reference sequence is recovered by despreading the received broadcast to attenuate the one or more additional reference signals.

20. The method of claim 17 wherein the reference signal is modulated onto a plurality of orthogonal frequency tones, the method further comprising demodulating the tones to recover the reference signal.

21. The method of claim 20 wherein the reference sequence is recovered by despreading the received broadcast in either time or frequency based on at least one wireless channel condition.

22. The method of claim 21 wherein the at least one wireless channel condition comprises time dispersion of the wireless channel.

23. The method of claim 21 wherein the at least one wireless channel condition comprises Doppler spread of the wireless channel.

24. The method of claim 21 further comprising determining the at least one wireless channel condition.

25. The method of claim 17 wherein the reference signal is scrambled, the method further comprising descrambling the reference signal.

26. The method of claim 17 wherein the reference sequence is frequency domain orthogonal to other reference sequences across the plurality of sectors.

27. An apparatus for wireless communications within a sector, comprising:
  means for receiving a broadcast within a sector, the received broadcast comprising a reference signal having a time domain orthogonal sequence applied to a reference sequence by splitting the reference signal into parallel streams with each stream carrying a reference sequence value for a period of time, the reference sequence values together constituting a time symbol, and by multiplying reference sequence values in different time symbols with a different constant value;
  means for recovering the reference sequence from the received broadcast; and
  means for decoding data in the received broadcast based at least in part on the reference sequence.

28. The apparatus of claim 27 wherein the received broadcast further includes interference comprising one or more additional reference signals broadcast over one or more different sectors.

29. The apparatus of claim 28 wherein the means for recovering the reference sequence comprises means for despreading the received broadcast to attenuate the one or more additional reference signals.

30. The apparatus of claim 27 wherein the reference signal is modulated onto a plurality of orthogonal frequency tones, the apparatus further comprising means for demodulating the tones to recover the reference signal.

31. The apparatus of claim 30 wherein the means for recovering the reference sequence comprises means for despreading the received broadcast in either time or frequency based on at least one wireless channel condition.

32. The apparatus of claim 31 wherein the at least one wireless channel condition comprises time dispersion of the wireless channel.

33. The apparatus of claim 31 wherein the at least one wireless channel condition comprises Doppler spread of the wireless channel.

34. The apparatus of claim 31 further comprising means for determining the at least one wireless channel condition.

35. The apparatus of claim 27 wherein the reference signal is scrambled, the apparatus further comprising means for descrambling the reference signal.

36. The apparatus of claim 27 wherein the reference sequence is frequency domain orthogonal to other reference sequences across the plurality of sectors.

37. An apparatus for wireless communications within a sector, comprising:
  a processing system configured to:
    receive a broadcast within a sector, the received broadcast comprising a reference signal having a time domain orthogonal sequence applied to a reference sequence by splitting the reference signal into parallel streams with each stream carrying a reference sequence value for a period of time, the reference sequence values together constituting a time symbol, and by multiplying reference sequence values in different time symbols with a different constant value;

recover the reference sequence from the received broadcast; and decode data in the received broadcast based at least in part on the reference sequence.

38. A non-transitory machine readable medium having code executable by a machine to:

receive a broadcast within a sector, the received broadcast comprising a reference signal having a time domain orthogonal sequence applied to a reference sequence by splitting the reference signal into parallel streams with each stream carrying a reference sequence value for a period of time, the reference sequence values together constituting a time symbol, and by multiplying reference sequence values in different time symbols with a different constant value;

recover the reference sequence from the received broadcast; and decode data in the received broadcast based at least in part on the reference sequence.

\* \* \* \* \*